July 17, 1951          E. W. HOLLIS          2,560,796
ARM CAP RELEASE FOR RECLINING BACKS OF COACH SEATS
Filed March 27, 1947          3 Sheets-Sheet 1
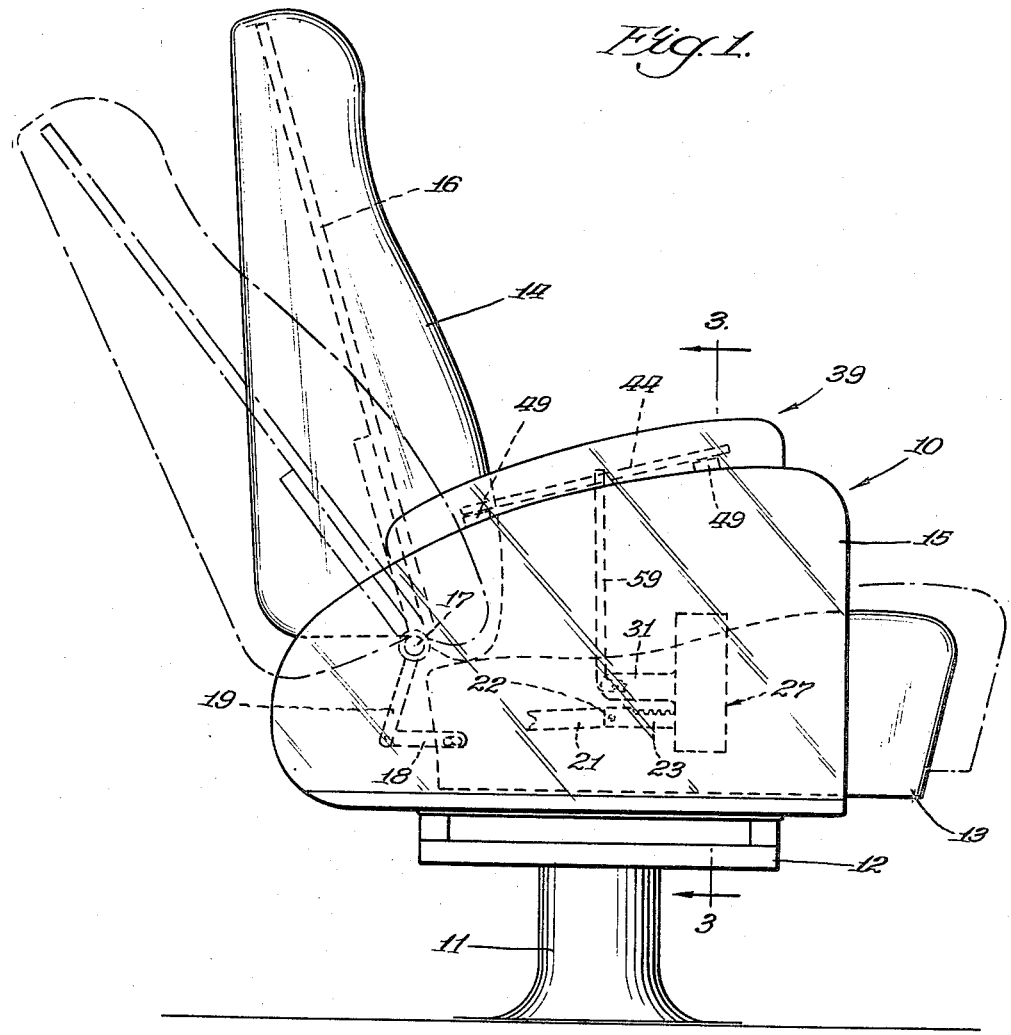
INVENTOR.
Edward W. Hollis
BY
Harvey M. Gillespie
Atty

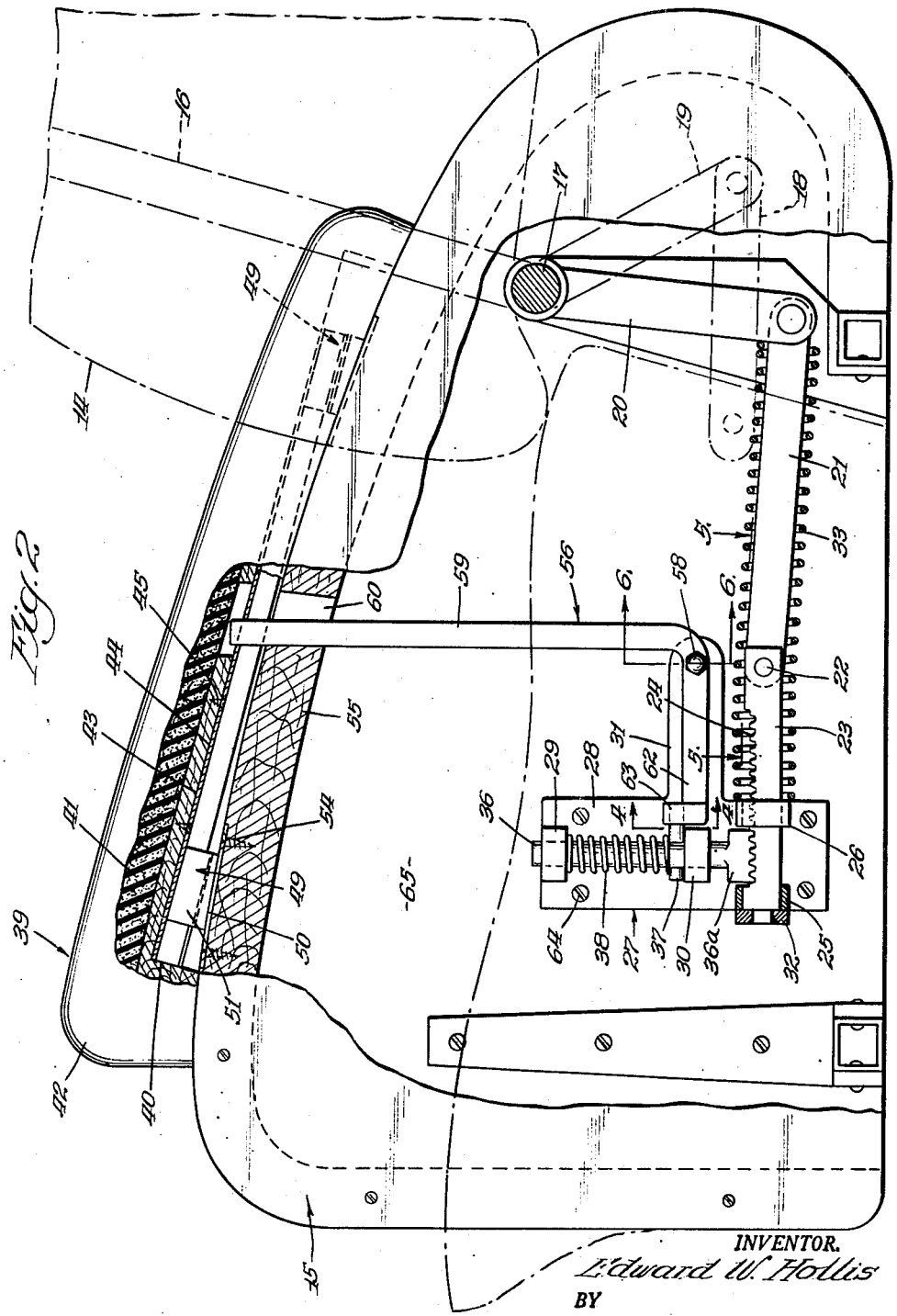

July 17, 1951  E. W. HOLLIS  2,560,796
ARM CAP RELEASE FOR RECLINING BACKS OF COACH SEATS
Filed March 27, 1947  3 Sheets-Sheet 3
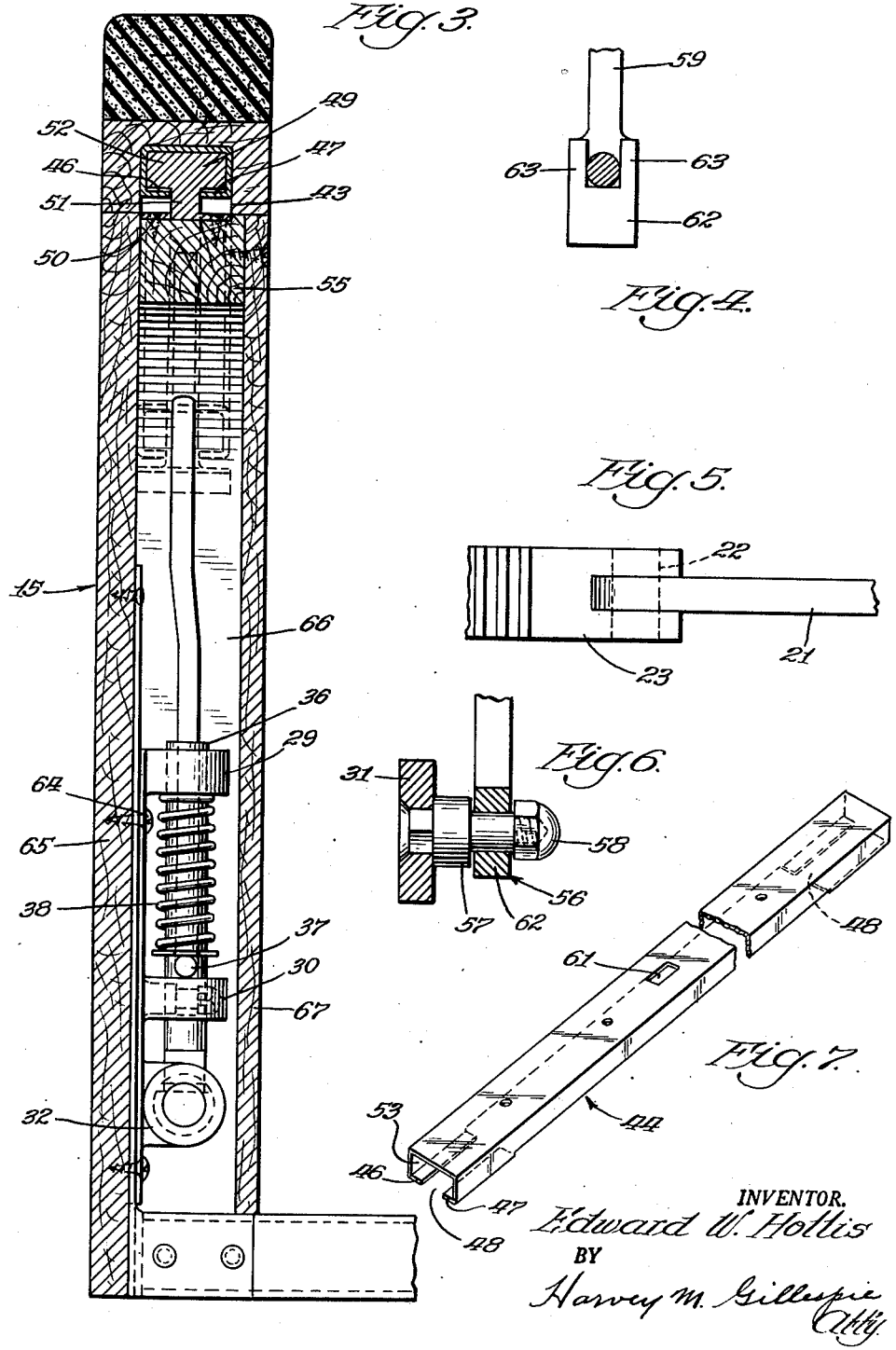
INVENTOR.
Edward W. Hollis
BY
Harvey M. Gillespie
Atty.

Patented July 17, 1951

2,560,796

UNITED STATES PATENT OFFICE 2,560,796

ARM CAP RELEASE FOR RECLINING BACKS OF COACH SEATS

Edward W. Hollis, Evanston, Ill., assignor to Coach & Car Equipment Corporation, Chicago, Ill., a corporation of Illinois Application March 27, 1947, Serial No. 737,492

3 Claims. (Cl. 155—161)

This invention relates to seat structures in which the back rests thereof are supported for adjustment to various reclining positions. Seat structures of this general class may be used in various situations and the invention, in its broad aspect, includes all such uses, but it is concerned more particularly with the seats having adjustable reclining backs which are adapted for use in the various fields of passenger transportation.

The seat structures of the above general class which have been heretofore installed in passenger vehicles, have included some form or other of back releasing mechanism intended to be actuated by the passengers, but these structures have not been entirely satisfactory. The push-buttons and levers, ordinarily used for the purpose of releasing the back structure, are usually arranged in inconspicuous locations and are not readily accessible when the passenger is in a reclining position.

One of the primary objects of the present invention is to provide a seat back releasing and restoring mechanism wherein the manual control not only is located in a conspicuous position but is of such a character as to be operable in a manner which seems natural to the passenger and which is readily accessible at all times. To this end, the novel manual control provided by this invention takes the form of an elongated arm cap which is part of the arm rest and is movable by the passenger to effect release of the back-holding mechanism and thereby enable the back of the seat to be adjusted either forwardly or backwardly to any desired position within its range of movement and to be restored to its normal position.

It is therefore a specific object of the invention to provide improved mechanism for releasably locking the back structure of a seat in any of a plurality of selected positions, which means includes a simplified manual control for unlocking the back structure preparatory to carrying out a desired change of reclination thereof and improved arrangements and constructions for automatically moving the back toward its normal position when the lock is released preliminary to a forward movement of the passenger's body toward an upright position.

Specifically, the invention includes the provision of an arm rest which is provided with a movable cap adapted to be moved in a direction by the occupant of the seat to bring about the release of the reclining back of the seat. The movable arm cap is superimposed upon the main side arm structure and is preferably upholstered or otherwise cushioned to provide a comfortable arm rest which is of sufficient length that it can be readily gripped by the passenger when he is in either an upright or in a reclining position. This arrangement is highly satisfactory from the standpoint of immediate accessibility and is further advantageous in that the natural action of the occupant of the seat, in attempting to rise from a partially reclined posture, is to grasp the arm rest on pulling himself up. In this way the force exerted by the back-restoring mechanism urges the back structure toward its normal position and thereby closely follows the forward movement of the passenger's body.

Other features of the invention are in the nature of detailed improvements which will be dealt with in conjunction with the description as follows:

The invention is illustrated in certain preferred embodiments in the accompanying drawings, wherein:

Fig. 1 is a side elevational view of a reclinable-back coach seat equipped with back control mechanism constructed in accordance with this invention.

Fig. 2 is an enlarged view, partly in section, showing the back operating and control mechanism; this view being taken from the inside of the right arm structure shown in Fig. 1 and looking in the opposite direction to that in which Fig. 1 is viewed.

Fig. 3 is an enlarged sectional view taken at line 3—3 of Fig. 1.

Fig. 4 is an enlarged detail taken at line 4—4 of Fig. 2.

Fig. 5 is an enlarged fragmentary detail view taken at line 5—5 of Fig. 2.

Fig. 6 is an enlarged sectional detail taken on line 6—6 of Fig. 2.

Fig. 7 is a perspective view of an elongate sheet metal channel member forming a component part of the slidable arm cap.

The coach seat 10 shown in side elevation in Fig. 1 comprises a supporting standard or base 11 adapted to be bolted to the floor, a frame 12, a seat cushion 13, a back 14 and a main side arm structure 15. Usually these seats are made up in units of two adjustable sections to accommodate two people sitting side by side. Such a unit comprises two individual seats, two individual backs and two side arm structures. However, for the purpose of describing the present invention, it is sufficient to consider only one-half of such double unit and it may be assumed that there is no middle arm rest between the two seat cushions. The back rest 14 is mounted on a pair of spaced upstanding bars 16 which are fixedly connected at their lower ends to a horizontal rocker-shaft 17 journaled in suitable bearings, not shown. The said back is therefore rotatable with said rocker-shaft between the fully upright position, shown in full lines in Fig. 1, and the fully reclined position, shown in dot-dash outline in the same figure. The seat cushion 13 is mounted on a suitable track, not shown, and is connected through the medium of a pair of links 18 and lever arms 19 to the rocker-shaft 17, by virtue of which connections it moves forwardly on its track concurrently with each rearward movement of back 14, and vice versa. So far as the subject invention is concerned, it is immaterial whether seat 13 is movable, as above described, or is stationary.

The back releasing mechanism shown in Figs. 2–6 inclusive is operative to lock the back 14 in any one of several positions, including the two extreme positions shown in Fig. 1, and a number of intermediate positions. The said mechanism is further operative to release the back to permit angular readjustment whenever the occupant of the seat so desires. Said releasing mechanism includes a lever arm 20 secured at its upper end to rocker-shaft 17 and pivotally connected at its lower end to one extremity of a horizontal link 21. The other end of link 20 is pivotally connected through a pin 22 to one end of a slide-bar 23 having a series of rack teeth 24 on its upper surface. Said slide-bar is mounted for lengthwise reciprocation in a pair of guide bearings 25 and 26 which are integral parts of a casting 27 comprising a rectangular base plate 28, a pair of vertically spaced lugs 29 and 30, and a horizontally extending bracket 31. The left hand end of slide-bar 23 is reduced in diameter to receive a collar 32 which is welded to the slide-bar and functions as a stop to limit the movement in one direction of said slide-bar; thus determining the extreme upright position of back structure 14.

A long helical spring 33 encircles link 21 and a portion of slide-bar 23 and bears at one end against guide bearings 26, and at its other end against lever arm 20. It will be apparent that spring 33 flexes transversely to accommodate the various angular positions of the lever 21 and continuously urges lever arm 20 in the counter-clockwise direction, as viewed in Fig. 2 to restore the back 14 to maximum upright position. When an occupant of the seat releases the locking mechanism and presses rearwardly against back 14, the resultant torque tends to rotate rocker-shaft 17 and lever arm 20 in the clockwise direction, a viewed in Fig. 2. This movement of lever 20 moves the link 21 and slide-bar 23 to the left, as viewed in said Fig. 2. Conversely, when the occupant of the seat releases the locking mechanism and partially or wholly withdraws his weight from the back 14, the resultant torque reduction tends to diminish the compressive force acting on spring 33.

The said locking means includes a vertical lock bolt 36 which is slidably mounted, vertically, in lugs 29 and 30 and is provided at its lower end with an enlarged foot portion 36a having a series of rack teeth designed to intermesh with the rack teeth 24 on the slide-bar 23. A dowel pin 37 passing diametrically through lock bolt 36 forms an abutment for the lower end of a coil spring 38. This spring encircles the lock bolt 36 and bears at its upper end against the lug 29. The lock bolt 36, it will be observed, is spring-biased downwardly by spring 38 and is operative automatically to lock slide-bar 23 against lengthwise movement. In this way the bolt 36 is effective to lock the back structure 14 in any one of numerous predetermined positions which may be selected by the occupant of the seat.

To release the back 14 for forward or back readjustment it is necessary to lift lock bolt 36 out of engagement with slide-bar 23 against the pressure of spring 38. This is accomplished by a novel arrangement which includes an elongate arm cap 39 superimposed upon the main side arm structure 15 and slidable lengthwise thereon to a limited extent. Said arm rest 39 is composed of an elongate wood block 40 capped with a layer 41 of sponge rubber or other cushioning material and has a cover 42 of upholstery fabric or leather. The under side of wood block 40 is slotted to form a lengthwise extending groove 43 in which is seated the elongate sheet metal channel member 44 shown in Fig. 7. Said channel member is secured to the wood block 40 by means of woodscrews 45 and has at each end a pair of opposed flanges 46—47 separated by slots 48 through which extend a pair of T-head anchor members 49—49. Each member 49 comprises a lower flange 50, a vertical portion 51 and an enlarged head 52 of rectangular cross-section, designed to slidably fit the guideways 53. The lower flanges 50 of anchor members 49 are secured by woodscrews 54 to the wooden top piece 55 forming a part side arm structure 15.

The two anchor members 49—49 serve to hold arm rest 39 in place on the curved upper edge of the main side arm, but there is sufficient looseness between the flanges 46—47 and the guide members 49—49, to permit the required movement of the arm cap on said curved upper surface of the arm structure to accomplish the requisite amount of movement of a bellcrank 56 to effect release of slide-bar 23.

Bellcrank 56 is fulcrumed on a stud 57 (see Fig. 6), which is anchored to bracket 31 and is held in place on said stud by a nut 58. Said bellcrank includes a long vertical lever arm 59, the upper end of which passes through a clearance opening 60 in top piece 55 of the side arm and is pivotally seated in an aperture 61 in the top wall of the channel member 44. The bellcrank also includes a short horizontal lever arm 62, the free end of which underlies one end of pin 37 and is provided with two upstanding ears 63—63 between which pin 37 is nested.

The arm cap 39 is shown in its forward position, that is to say, the position which it normally assumes and in which it is yieldably held by spring 38 acting through the bellcrank 56.

Whenever an occupant of the coach seat wishes to recline, he simply allows his weight to bear against the back structure of the seat and pulls back on the arm cap. This immediately releases the back-holding mechanism and the said occupant can then tilt the back of the seat to any desired extent, within its range of its movement, by regulating the amount of pressure he brings to bear against the back structure. After adjusting the back to the desired inclination, he releases the arm cap and the back is thereupon locked in the desired posture. When, on the other hand, the occupant of the seat wishes to rise from a recumbent posture, he naturally grasps the arm cap in order to pull himself up, and in doing so he moves the arm rest rearwardly, thus again unlocking the backholding mechanism so that the pressure of spring 33 functions to restore the back 14 to its normal position.

The casting 27 is secured by any suitable means 64 to the outer panel 65 of the main side arm structure 15, and all of the back-holding mechanism, except rocker-shaft 17, is housed within a compartment 66 between outer panel 65 and removable inner panel 67.

The lengthwise movement of arm rest 39 is restricted by the range of movement of arm 59, and said arm rest cannot be moved lengthwise sufficiently to effect removal thereof while said arm 59 remains in place. It is, therefore, necessary to remove bellcrank 56 from its supporting stud 57 and thereby disengage arm 59 from channel member 44 in order to be able to move the arm rest lengthwise to a sufficient degree to disengage the same from anchor members 49. Similarly, the arm rest cannot be put in place, in engagement with anchor members 49, except when bellcrank 56 is dismounted, because it cannot otherwise be moved forwardly far enough to permit flanges 46 and 47 to clear anchor members 49. For that reason, installation of the arm rest and the several parts of the locking and restoring mechanism, exclusive of bellcrank 56, is carried out with said bellcrank detached from its supporting stud, the mounting of the bellcrank being the final step in the entire assembling operation.

It will be observed from the disclosure of the invention that the provision of the side arm structure with a movable cap and the utilization of the cap for the purpose of manually controlling the adjustable back-holding and restoring mechanism is an important feature of the invention. It will also be observed that there are patentably novel features incorporated in the described mechanism, aside from the specific form of movable arm cap herein shown, and that these features of the invention are capable of being modified in structure and operation without departure from the spirit of the invention.

I claim:

1. The combination with a seat having a side structure, an adjustably reclinable back, and a spring biasing said back toward upright posture, of mechanism including a slide-bar operatively connected with the back, and a locking bolt associated therewith for releasably locking said back in any of several reclined positions, and means for releasing said locking bolt from its locking position including a lever pivotally supported on said structure and projecting upwardly from its pivotal center and an elongate arm cap superimposed upon said structure and pivotally connected to the free upper end of said lever, said arm cap having an elongate recess opening downwardly and in which is seated an elongate channel member having an opening for reception of said lever, said channel member having each end formed with inturned flanges providing guideways for slidable anchoring engagement with an anchoring element secured to the top of said side structure.

2. The combination with a seat structure including a side portion, an adjustable reclinable back supported for pivotal movement relative to the side portion, and means including a spring positioned to exert pressure against said back for moving it toward its upright position; of locking means mounted on said structure and including a locking element supported on the side portion for releasably locking said back in both its normal upright position and in a reclining position, means for unlocking said mechanism including a lever pivotally supported on said structure and operatively engaging said locking element, and an elongated arm cap superimposed upon said side portion and movably engaging an end of said lever to unlock said mechanism to permit adjustment of said back in either direction; means for movably supporting the arm cap on said portion comprising supporting members fixed to and extending upwardly from the side portion, a metallic channel positioned in the arm cap and having slidable engagement with said support members and provided with means for engaging said lever.

3. The combination with a seat structure including a side portion, a reclinable back including a back rest and a lever, the latter of which is pivotally mounted in said structure and operable to tilt the back to various reclining positions; of mechanism for releasably locking said back in said various reclining positions comprising a bracket fixed on said side portion, a slide-bar supported in said bracket for lengthwise movement in a horizontal plane, a link interconnecting one end of said slide-bar with a portion of said lever, a helical compression spring encircling said link and a portion of said slide-bar and pressing against said lever and a portion of said bracket to bias said back towards its normal upright position, a vertical locking bolt slidably supported on said bracket and engaging said slide-bar to lock the same against lengthwise movement, a spring urging said bolt toward locking engagement with said side bar, a bell crank having a horizontal lever arm connected to said bolt and operated to move said bolt lengthwise against said spring to unlock said slide-bar, said bell crank having a vertical arm projecting upwardly, and an arm cap superimposed upon said side structure and manually movable lengthwise by a person sitting in the seat, said arm cap being connected to the upper end of said bell crank arm and adapted to actuate the same to withdraw the bolt from said side bar.

EDWARD W. HOLLIS.

REFERENCES CITED

The following references are of record in the file of this patent:

UNITED STATES PATENTS

| Number | Name | Date |
| --- | --- | --- |
| 1,628,764 | Beech | May 17, 1927 |
| 2,018,828 | Bell | Oct. 29, 1935 |
| 2,300,561 | Ferreira | Nov. 3, 1942 |